R. W. WOOD.
WIND SHIELD FOR AUTOMOBILES.
APPLICATION FILED AUG. 24, 1916.
1,267,303.
Patented May 21, 1918.
Fig. 2.
Fig. 1.
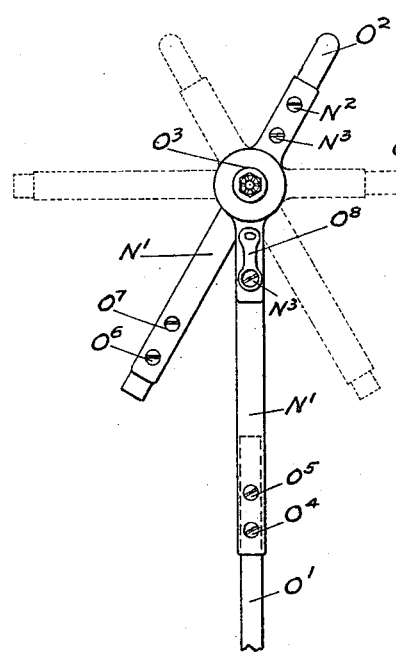
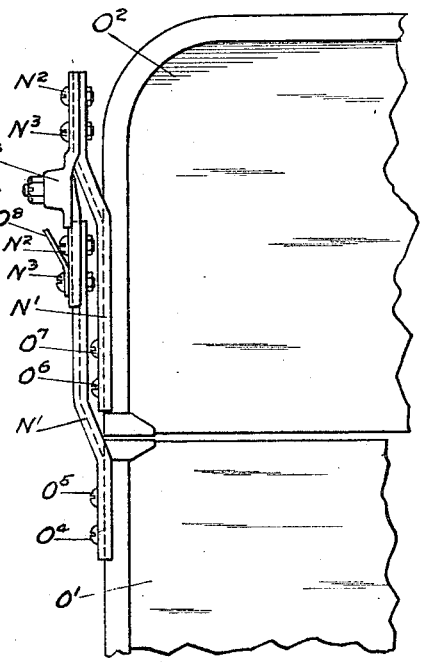
Fig. 3.
Fig. 5.
Fig. 4.
Witnesses:
Richard W. Wood
Inventor.
By _____ Atty.

UNITED STATES PATENT OFFICE.

RICHARD W. WOOD, OF PORTLAND, OREGON.

WIND-SHIELD FOR AUTOMOBILES.

1,267,303.  Specification of Letters Patent.  Patented May 21, 1918.

Application filed August 24, 1916. Serial No. 116,632.

*To all whom it may concern:*

Be it known that I, RICHARD W. WOOD, a citizen of the United States, residing in the city of Portland, county of Multnomah and State of Oregon, have invented certain new and useful Improvements in Wind-Shields for Automobiles, of which the following is a specification.

The present wind shield of the Ford automobile consists of a lower shield and an upper shield, the lower shield being fixed, and the upper shield being hingedly secured at its lower edge to the top of the lower shield, the hinge axis being at the joint, whereby the upper shield can be folded backwardly to different inclined positions, or can be folded down flatwise against the lower shield.

The object of my invention is to provide extremely simple, economical and practical means, whereby the top shield can be remounted so that it can be rocked in either direction upon an axis intermediate its upper and lower edges, thus making it possible to swing the upper shield outwardly and upwardly so that it is possible to see under the same, and at the same time have the shield act as a protection against rain, or to swing it inwardly at its lower edge so as to direct inrushing air downwardly into the foot space of the machine body where the heat at times becomes uncomfortable.

Another object of my invention is to provide such means as will require no structural change in the present wind shield, as it is turned out from the factory, it being only necessary with my invention to insert two small supporting brackets at the opposite ends of the shields, using the same hinges and the same hinge bolts that were originally used.

In order to more clearly explain my invention I have illustrated the preferred form thereof in the accompanying sheet of drawings, which I will now describe.

Figure 1 is a face view of one end of a wind shield embodying my invention, it being understood that both ends are the same;

Fig. 2 is an end view thereof, showing the upper wind shield in different positions of adjustment;

Fig. 3 is a flat view of one of my insert supporting brackets;

Fig. 4 is an edge view thereof; and

Fig. 5 is an end view.

In describing the elements of my invention and its application to a Ford automobile, I will use the letter O, with different exponents, to designate old parts, and the letter N, with different exponents, to designate the new parts constituting my invention.

In the drawings, $O^1$ designates the lower wind shield, $O^2$ the upper wind shield, and $O^3$ the wind shield hinge which is secured to the ends of said upper and lower wind shields as the machine comes from the factory, by means of the screw bolts $O^4$, $O^5$, $O^6$ and $O^7$, as will be readily understood by reference to the drawings.

My invention consists in providing four supporting brackets, which are exactly alike, and are designated $N^1$—$N^1$. Two of these brackets are used at each end of the wind shield. Four brackets, with two short bolts $N^2$ and $N^3$ for each bracket, constitute one complete set.

In applying my invention to a Ford wind shield, the screw bolts $O^4$, $O^5$, $O^6$ and $O^7$ and the hinge $O^3$ are removed. The lower ends of two of the hinged brackets $N^1$—$N^1$, are secured, respectively, to the edges of the lower and upper wind shields by means of the same bolts $O^4$, $O^5$, $O^6$ and $O^7$, inserted in the same holes in the wind shields from which they are removed. The hinge $O^3$, has its lower portion bolted to the upper end of the lower bracket $N^1$, by means of the bolts $N^2$ and $N^3$, and its upper portion bolted to the upper end of the upper supporting bracket $N^1$, by two similar short bolts $N^2$ and $N^3$. This, it will be noted, carries the hinge axis to a point between the upper and lower edges of the upper wind shield, thus making it possible to turn said upper wind shield upon said axis in either direction, as clearly indicated in full and dotted lines, Fig. 2. The brackets $N^1$—$N^1$, are preferably made of a length so that the upper wind shield is spaced slightly above the upper edge of the lower wind shield so as to give proper clearance for the upper wind shield to swing above the same. As all of the supporting brackets are exactly alike, it will be evident that my attachment can be very cheaply provided, and as no reconstruction or new holes are necessary, it requires but a very few moments of time in which to equip the present wind shield of a Ford automobile with my invention, thus clearly improving the present wind shield arrangement, and making it possible to adjust the upper wind shield in various positions, and thus to obviate present objections and make possible adjustment of the upper wind shield, whereby air can be directed downwardly into the front of the automobile body, where the heat frequently becomes uncomfortable. The clip O⁸, for attachment of the strap from the top, is attached to the lower short bolt N³, as shown in Figs. 1 and 2.

I am aware that slight changes can be made in my invention as here illustrated without departing from the spirit thereof, and I do not, therefore, limit the invention to the exact details here shown and described, except as I may be limited by the hereto appended claims.

I claim:

1. In combination with an upper and lower wind shield for automobiles, an upwardly projecting supporting bracket detachably secured to the end of the lower wind shield, an upwardly projecting bracket detachably secured to the end of the upper wind shield, the upper ends of both of said brackets being spaced from the ends of the wind shield frames, and a hinge connecting the upper ends of said brackets together, whereby said upper wind shield can be turned about an axis intermediate its upper and lower edges.

2. In combination with lower and upper wind shields arranged one above the other, an off-set bracket detachably attached at its lower end to the end of each of said wind shields, and extended at a space therefrom at its upper end, and a hinge connecting two ends of said brackets at a space from the ends of said wind shields, the axis of said hinge being intermediate the upper and lower edges of said upper wind shield.

3. In combination with the lower and upper wind shields of an automobile, a bracket detachably secured at its lower end to the end of the lower wind shield and extending outwardly and upwardly at a space from the end of the upper wind shield, a similar bracket detachably secured to the end of the upper wind shield and extended outwardly and upwardly with its upper end in alinement with the upper end of said lower bracket, and a hinge detachably connecting the upper ends of said brackets, substantially as described.

Signed at Portland, Multnomah county, Oregon, this 19th day of August, 1916.

RICHARD W. WOOD.

In presence of—
I. M. GRIFFIN,
J. C. STRENG.

Copies of this patent may be obtained for five cents each, by addressing the "Commissioner of Patents, Washington, D. C."